United States Patent
Morris et al.

(10) Patent No.: US 8,351,433 B2
(45) Date of Patent: Jan. 8, 2013

(54) INTELLIGENT ELECTRONIC DEVICE WITH SEGREGATED REAL-TIME ETHERNET

(75) Inventors: Robert E. Morris, Viola, ID (US); Tony J. Lee, Pullman, WA (US); Andrew A. Miller, Moscow, ID (US); Lisa Gayle Nelms, Colfax, WA (US); Benjamin S. Day, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 309 days.

(21) Appl. No.: 12/797,419

(22) Filed: Jun. 9, 2010

(65) Prior Publication Data

US 2011/0069709 A1    Mar. 24, 2011

Related U.S. Application Data

(63) Continuation-in-part of application No. 12/562,224, filed on Sep. 18, 2009.

(51) Int. Cl.
*H04L 12/56* (2006.01)
(52) U.S. Cl. ........................................ 370/392; 370/428
(58) Field of Classification Search .................. None
See application file for complete search history.

(56) References Cited

U.S. PATENT DOCUMENTS

| | | |
|---|---|---|
| 4,535,306 A | 8/1985 | Yamaguchi |
| 4,546,486 A | 10/1985 | Evans |
| 4,768,178 A | 8/1988 | Conklin |
| 4,808,884 A | 2/1989 | Hull |
| 5,103,466 A | 4/1992 | Bazes |
| 5,235,590 A | 8/1993 | Taguchi |
| 5,363,377 A | 11/1994 | Sharpe |
| 5,793,869 A | 8/1998 | Claflin |
| 6,456,831 B1 | 9/2002 | Tada |
| 6,678,134 B2 | 1/2004 | Sugiura |
| 6,754,210 B1 | 6/2004 | Ofek |
| 6,847,691 B2 | 1/2005 | Torikoshi |
| 6,859,742 B2 | 2/2005 | Randall |
| 6,891,441 B2 | 5/2005 | Rochow |
| 6,937,683 B1 | 8/2005 | Ratzel |
| 6,947,269 B2 | 9/2005 | Lee |
| 7,239,581 B2 | 7/2007 | Delgado |
| 7,272,201 B2 | 9/2007 | Whitehead |
| 7,283,568 B2 | 10/2007 | Robie |

(Continued)

FOREIGN PATENT DOCUMENTS

GB      2278519      11/1994

(Continued)

OTHER PUBLICATIONS

PCT/US2010/049169 Patent Cooperation Treaty Notification of Transmittal of the International Search Report and the Written Opinion, International Search Report, and Written Opinion, Nov. 5, 2010.

(Continued)

*Primary Examiner* — Hassan Phillips
*Assistant Examiner* — Duc Duong
(74) *Attorney, Agent, or Firm* — Eugene M. Cummings, PC

(57) ABSTRACT

A system and method for optimizing the handling of data on a priority basis within an intelligent electronic device is disclosed. A FIFO receives messages and the messages are each associated with a subscription identifier. The messages are then routed to and stored in buffers, each associated with a subscription identifier.

9 Claims, 19 Drawing Sheets

U.S. PATENT DOCUMENTS

| | | |
|---|---|---|
| 7,463,467 B2 | 12/2008 | Lee |
| 7,571,216 B1 | 8/2009 | Mcrae |
| 7,617,408 B2 | 11/2009 | Frazier |
| 7,701,683 B2 | 4/2010 | Morris |
| 2001/0023464 A1 | 9/2001 | Deck |
| 2002/0069299 A1 | 6/2002 | Rosener |
| 2002/0080808 A1 | 6/2002 | Leung |
| 2004/0196855 A1* | 10/2004 | Davies et al. ............ 370/395.42 |
| 2007/0002746 A1* | 1/2007 | Shankar et al. ................ 370/235 |
| 2007/0127487 A1* | 6/2007 | Kim et al. .................... 370/392 |
| 2007/0147415 A1 | 6/2007 | Marusca |
| 2008/0071482 A1 | 3/2008 | Zweigle |
| 2008/0235355 A1 | 9/2008 | Spanier |
| 2009/0141727 A1 | 6/2009 | Brown |
| 2009/0260083 A1* | 10/2009 | Szeto et al. ..................... 726/22 |
| 2009/0300165 A1* | 12/2009 | Tuckey et al. ................. 709/224 |
| 2010/0195763 A1 | 8/2010 | Lee |
| 2012/0078555 A1* | 3/2012 | Banhegyesi et al. ............ 702/64 |

FOREIGN PATENT DOCUMENTS

| | | |
|---|---|---|
| JP | 10247377 | 9/1998 |
| JP | 2001221871 | 8/2001 |
| JP | 2001221874 | 8/2001 |
| WO | 0057527 | 9/2000 |
| WO | 0016525 | 3/2001 |
| WO | 2005088911 | 9/2005 |

OTHER PUBLICATIONS

D.L. Mills, Experiments in Network Clock Synchronization, Network Working Group Request for Comments: 957, Sep. 1985.

D. Mills, Simple Network Time Protocol (SNTP) Version 4 for IPv4, IPv6, and OSI, Network Working Group Request for Comments: 4330, Jan. 2006.

* cited by examiner

1402

| Message Number | Cost |
|---|---|
| 1 | 20 |
| 2 | 50 |
| 3 | 100 |
| 4 | 12 |
| 5 | 15 |
| 6 | 40 |
| 7 | 60 |
| 8 | 10 |

Figure 14

INTELLIGENT ELECTRONIC DEVICE WITH SEGREGATED REAL-TIME ETHERNET

CROSS-REFERENCE TO RELATED APPLICATIONS

This application is a continuation-in-part of U.S. patent application Ser. No. 12/562,224, entitled "INTELLIGENT ELECTRONIC DEVICE WITH SEGREGATED REAL-TIME ETHERNET," filed 18 Sep. 2009, which is assigned to Schweitzer Engineering Laboratories, Inc. of Pullman, Wash., and which is hereby incorporated by reference in the entirety.

FIELD OF THE INVENTION

The present invention relates generally to apparatus and methods for communicating data to and from an intelligent electronic device (IED) and more particularly to apparatus and methods of segregating urgent communications from non-urgent communications within an IED, so that the urgent communications can be dealt with more promptly.

DESCRIPTION OF THE PRIOR ART

The modern power grid utilizes a sophisticated network of Intelligent Electronic Devices ("IEDs") to ensure proper operation. For example, IEDs commonly monitor various power line quantities, such as voltage and current, to ensure that a given power line segment has not become faulted. When a power line segment has been faulted, the IED monitoring that segment will cause a circuit breaker or other form of switchgear to operate to isolate the offending power line segment. When an IED makes a determination to isolate a power line segment, in some circumstances it may also send a communication to another IED to complete the isolation of the power line segment from the power grid.

In addition to control data, such as that described above, IEDs commonly communicate other data to one another and other devices involved in power protection and control systems. IED communications have become sophisticated enough that they use a wide variety of protocols. Generally, however, IEDs utilize a single network connection, such as an Ethernet connection. While the use of a single connection provides many advantages, such as lower wiring, equipment, testing and labor costs, it also presents certain challenges.

A network switch is a computer networking device that connects network segments or endpoints. Network switches come in a variety of types, such as Token Ring, Fibre Channel, and Ethernet, and can also be used to connect varying types of network segments. An Ethernet switch is a network switch that connects various Ethernet endpoints or network segments together.

An Ethernet switch operates by saving the originating MAC addresses of received frames, as well as the port on which a frame was received in the switch's MAC address table. A switch will then selectively transmit to an alternate port based on the frame's destination MAC address and previous entries in the MAC address table. If a destination MAC address is unknown, a broadcast address, or a multicast address, the switch will transmit the frame out of all connected ports except for the one it was received on. One last special case is where the destination MAC address is the same as the originating MAC address, where the switch will simply filter the frame out.

Most importantly, as described above, certain communications are more urgent than other communications. For example, control data or real time samples may only have value for a limited period of time, and, accordingly, can be said to be more urgent than setup data from an administrator, which may have value of a more permanent nature. For example, an IED may receive urgent control data using IEC 61850 GOOSE (Generic Object Oriented System Event), or Mirrored Bits® protocol. The use of one physical connection makes it difficult for an IED to discriminate between urgent data and non-urgent data. Generally, the network stack looks at data in the order that it is received.

One prior art solution that IEDs have employed is for an IED to incorporate a custom network stack that "snoops" received data frames for urgent data, and processes those frames first. While this approach allows more urgent data to be handled first it comes: i) at the cost of significant processor time as it must search through received data, and, ii) complexity in the form of a custom software stack.

Another issue that arises in dealing with messages passed between IEDs is that, even among urgent messages, certain messages require higher priority handling than other messages. This is due to another related issue, which is that the processing of messages is not the primary task of an IED, but rather one that must be subjected to tight limits to prevent message processing from starving out those tasks that are of higher priority.

Generally, prior art IEDs process information sequentially, meaning that messages are stored in a FIFO, and are processed in the order they were received, from oldest to newest. This presents a number of issues. First, all FIFOs are necessarily of finite size; accordingly, only a limited number of messages can be stored. If messages are received faster than they can be processed, eventually, some data in the FIFO, which is usually the oldest message received, will be overwritten. Second, prior art message processing systems generally process messages in the order they are received, despite the fact that many times, a newer message will eliminate the need to process an older message. Accordingly, prior art systems can discard newer more important messages, and spend time processing older messages that do not need to be processed.

IEDs cannot address the issue of a limited FIFO size and in-order processing by devoting additional processor time to the task of message handling, as IEDs have numerous other high priority tasks to attend to. Prior art solutions have included the use of preemptive multitasking systems and high priority interrupts. Preemptive multitasking systems assign a fixed amount of time to each task, while high priority interrupt systems utilize the familiar foreground/background processing model. As both of these systems are well known in the art, they will not be addressed further herein.

OBJECTS OF THE INVENTION

Accordingly, it is an object of this invention to provide a system and method for prioritizing the handling of priority data so that data from more important sources or subscriptions are handled prior to data from less important subscriptions.

Another object of the invention is to provide a system and method for limiting the time spent processing messages in an IED.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing a system and method for optimizing the handling of network data for an IED. The IED includes a FIFO for storing a predetermined number of messages originating from a plurality of other devices, as well as a plurality of buffers each for holding one message. In particular, messages received in the FIFO are examined to determine the subscription identifier with which the messages are associated. Messages are then routed to and stored in the appropriate buffer.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 14 is a message queue showing a number of messages each with an associated processing cost;

FIGS. 18A and 18B illustrate frame diagrams for Ethernet frames constructed in accordance with this disclosure, wherein FIG. 18A illustrates a fixed cost assigned to a message from a particular subscription and FIG. 18B illustrates the process of calculating a variable cost for each message based on its contents;

DETAILED DESCRIPTION OF THE ILLUSTRATED EMBODIMENT

Figure 1:
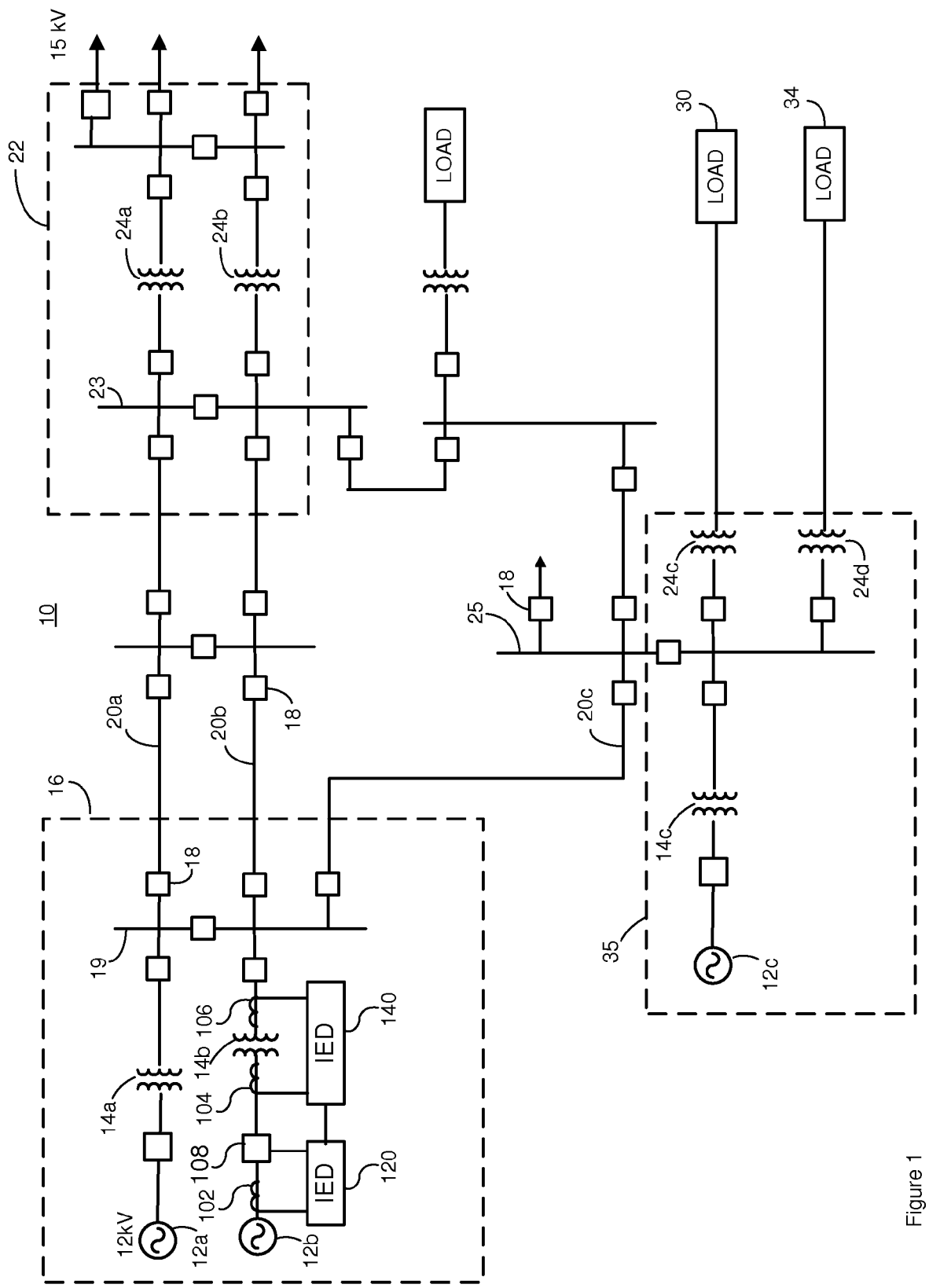
FIG. 1 is a simplified line schematic diagram of an electrical power distribution system illustrating the use of IEDs supervising a power grid.

Turning to the Figures, and to FIG. 1 in particular, a power distribution system 10 includes, among other components, a pair of generators 12a and 12b configured to generate three-phase sinusoidal power waveforms, such as, for example, 12 kV AC waveforms. Generally, each generator will be protected by a circuit breaker; for example, generator 12b is protected by circuit breaker 108, which is controlled by IED 120. Also included are step up transformers 14a and 14b which are configured to increase the generated waveforms to higher voltage sinusoidal waveforms such as, for example, 138 kV AC waveforms. The step up transformers operate to provide higher voltage waveforms to long distance transmission lines 20a and 20b. As illustrated the generators and step up transformers are part of a substation 16 and can be interconnected by a bus 19 through the operation of a circuit breaker that is depicted but not numbered.

A second substation 22 is depicted as including two step down transformers 24a and 24b that are configured to transform the higher voltage waveforms transported by the long distance transmission lines 20a and 20b to a waveform that is more suitable for distribution to a load, such as, for example, 15 kV AC. A bus 23 can interconnect different distribution lines through the operation of a circuit breaker that is depicted but not numbered.

A third substation 35 is depicted as including a third generator 12c as well as an additional step up transformer 14c, and two step down transformers 24c and 24d that connect to loads 30 and 34 respectively. A bus 25 can interconnect the third substation 35 to the rest of the power distribution system through transmission line 20c by operating a circuit breaker that is depicted but not numbered.

Figure 2:
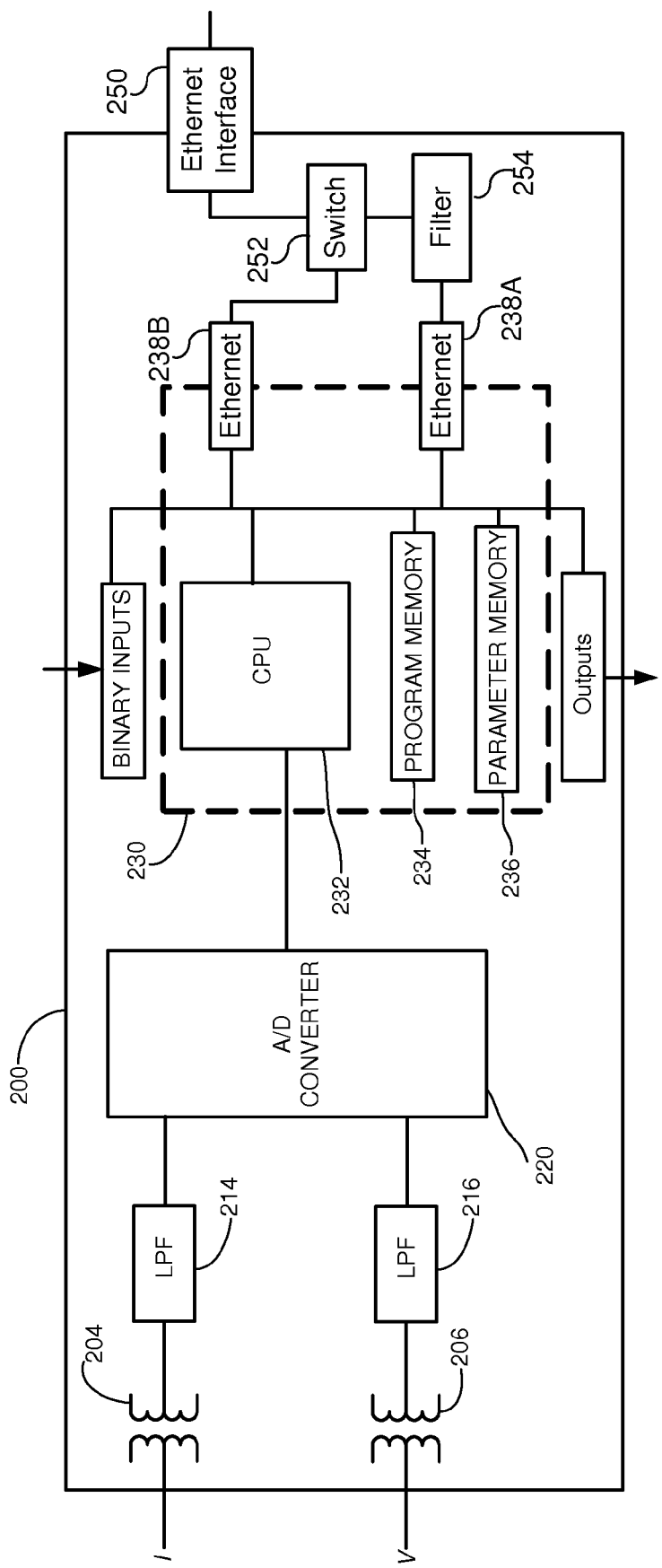
FIG. 2 is a block diagram of an IED that segregates network data in accordance with this disclosure.

FIG. 2 depicts an IED 200 integrating a network data segregating scheme in accordance with this disclosure. A microcontroller 230 incorporates a CPU 232, program memory 234, which could be FLASH memory or electrically-erasable ROM, and parameter memory 236, which could be static RAM or dynamic RAM. As depicted the IED 200 examines one channel of current, which is acquired by current transformer 204, low pass filter 214, and A/D converter 220. The IED also examines one channel of voltage through potential transformer 206, low pass filter 216, and A/D converter 220. In addition, IED 200 accepts a number of binary inputs, and produces a number of outputs, such as contact closures to control a circuit breaker. Persons of skill in the art will understand that this is a simplified view of an IED, which generally will examine numerous line parameters including multiple current and voltage channels, as well as incorporate many other functions.

An external Ethernet interface 250 is adapted to communicate with other IEDs and other devices used within the power grid, such as monitoring stations (not depicted). A switching device 252 examines Ethernet frames that are received via Ethernet interface 250 and routes the received frames down one of two paths based on a network data type indicia contained within each frame. A first path handles urgent communications, which are routed through filtering device 254 to a first Ethernet port 238A. It should be noted that filtering device 254, which is discussed in detail later in this disclosure, is a beneficial but non-essential component of IED 200. A second path handles non-urgent communications, which are routed to a second Ethernet port 238B. The particular operation of switching device 252 is explained below.

Switching device 252 examines Ethernet frames received by Ethernet port 250 to determine if a particular frame is of an urgent or non-urgent nature. To accomplish this, the switching device 252 examines each received frame for a network data type indicia. One possible indicia of urgent network data is the source of the communications; within a particular power grid, certain devices, such as other IEDs, are more likely to source urgent communications than other devices, such as monitoring computers. Another possible indicia of urgent network data is the destination of the communications, as certain destination addresses, such as multicast or broadcast addresses, can indicate that the data is urgent network data. Accordingly, one way that switching device 252 can make this determination is to use the MAC address from which each Ethernet frame originated or to which the Ethernet frame is destined as a network data type indicia, and then routing those frames received by urgent communications sources, such as other IEDs, to the urgent communications path, while routing non-urgent communications to the communications path intended for non-urgent communications. In an implementation adapted to take advantage of Ethernet MAC addresses, switching device 252 could be an Ethernet switch integrated circuit.

Another way to determine if a communication is of an urgent nature is to examine the contents of the data to determine what protocol the data is communicating over, and use the underlying protocol as a network data type indicia. For example, if a particular Ethernet frame contains IEC-61850 GOOSE data, it is likely that the data is of an urgent nature. In an implementation adapted to determine with which protocol a particular frame was sent over, switching device 252 could be, among other implementations, a custom field programmable gate array (FPGA) or application-specific integrated circuit (ASIC).

It should be noted that combinations of the network data type indicia recited above, as well as other network data type indicia that have the property of indicating, in a broad sense, the type of data being transmitted on the network, could be used in addition to or in place of the network data type indicia described above.

Data may be sent from the microcontroller 230 by either or both ports 238A and 238B. If all data is sent from one port, then the switching device 252 and packet filtering device 254 essentially act as pass through devices for data to the Ethernet interface 250. If data is sent by both ports 238A and 238B, then the switching device may order data sent from the urgent port 238A to be sent prior to data sent by the non-urgent port 238B, with packet filtering device 254 acting as a pass through. This provides an improvement in the delay of the urgent data being received by other devices, without a corresponding increase in the programming complexity of the microcontroller.

Figure 3:
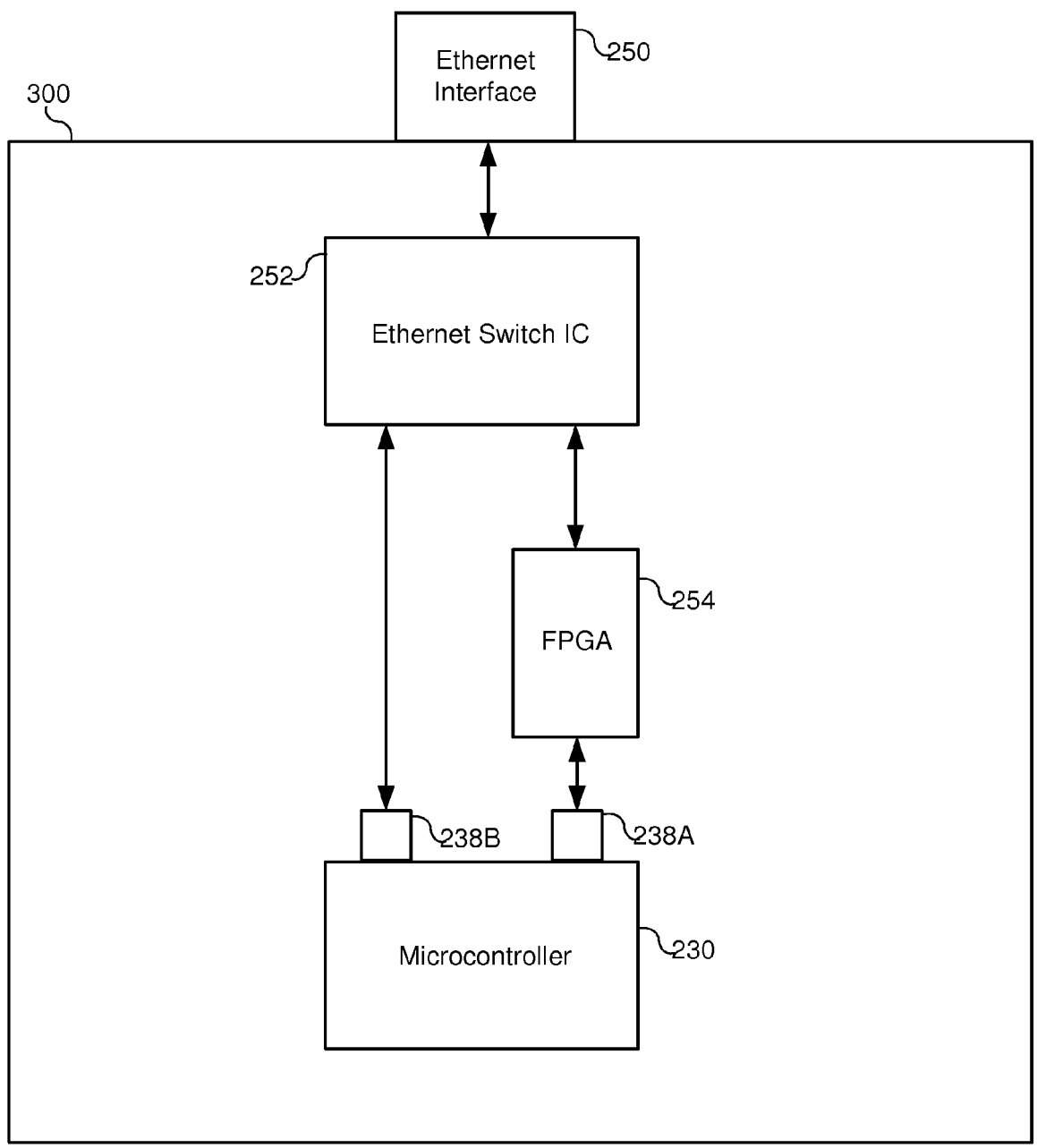
FIG. 3 is a simplified block diagram of a hardware solution to segregate network data in accordance with this disclosure.

FIG. 3 illustrates one possible communications path 300 for use within the IED 200. In particular, Ethernet interface 250 receives network data from other devices associated with a power grid. Network data is routed to an Ethernet switch IC 252. The Ethernet switch IC 252 operates to determine that network data originating from certain MAC addresses or destined for certain MAC addresses will be routed as urgent data to the first Ethernet port 238A and data that originates from other MAC addresses or is destined for other MAC addresses will be routed as non-urgent data to the second Ethernet port 238B.

As Ethernet is a multidrop network, messages received by IED 200 may not be intended for that IED, but rather, for another device. Accordingly, a packet filtering device 254 is used to discard any data from the urgent route that is intended for a different IED prior to delivering it to the microcontroller 230. In one embodiment of the disclosed network data segregating system, the packet filtering device is a FPGA 254 and is configured to discard any Ethernet frames that do not contain expected destination MAC addresses. This will prevent the microcontroller from examining, on an expedited basis, urgent communications intended for another IED.

In certain systems, data may be urgent with regards to certain devices, but not with regards to other devices. Accordingly, data generated from a particular MAC address should be handled urgently by some devices, but not by other devices. Accordingly, in another embodiment the packet filtering device 254 can be adapted to advantageously filter Ethernet frames on the source MAC address, to determine if the frame originated from a set of urgent MAC addresses, where the set of MAC addresses considered to be urgent can be defined on a device by device basis.

Certain embedded protocols may also include indications that data is urgent. Accordingly, packet filtering device 254 can be adapted to advantageously utilize embedded protocol information. One such example would be the IEC 61850 GOOSE APP ID field, and the packet filtering device 254 can be adapted to only pass Ethernet frames where with a GOOSE APP ID field that has certain characteristics.

It should also be noted that combinations of the above recited filtering indicia could be utilized. For example, the packet filtering device 254 could examine both the Ethernet frame destination MAC address as described above, as well as the GOOSE APP ID field. Furthermore, more complicated filtering schemes could be used as well. For example, the packet filtering device 254 could initially filter on Ethernet frame destination MAC address and GOOSE APP ID field, but, after receiving at least one frame that met the required criterion, could then use the source MAC address of the received Ethernet frame to treat all frames generated by the corresponding device as urgent.

Data may be sourced from the microcontroller by either or both of urgent port 238A and non-urgent port 238B. If data is sourced from only one port, then FPGA 254 and Ethernet Switch IC 252 effectively act as pass through devices for data sourced by microcontroller 230. However, if data is sent from both ports 238A and 238B, the Ethernet switch IC 252 may be adapted to order data received from urgent port 238A so that it is sent before data received from non-urgent port 238B, thereby providing an improvement in the delay with which urgent data will be received by other devices, without any additional complexity in programming of the microcontroller.

Figure 4:
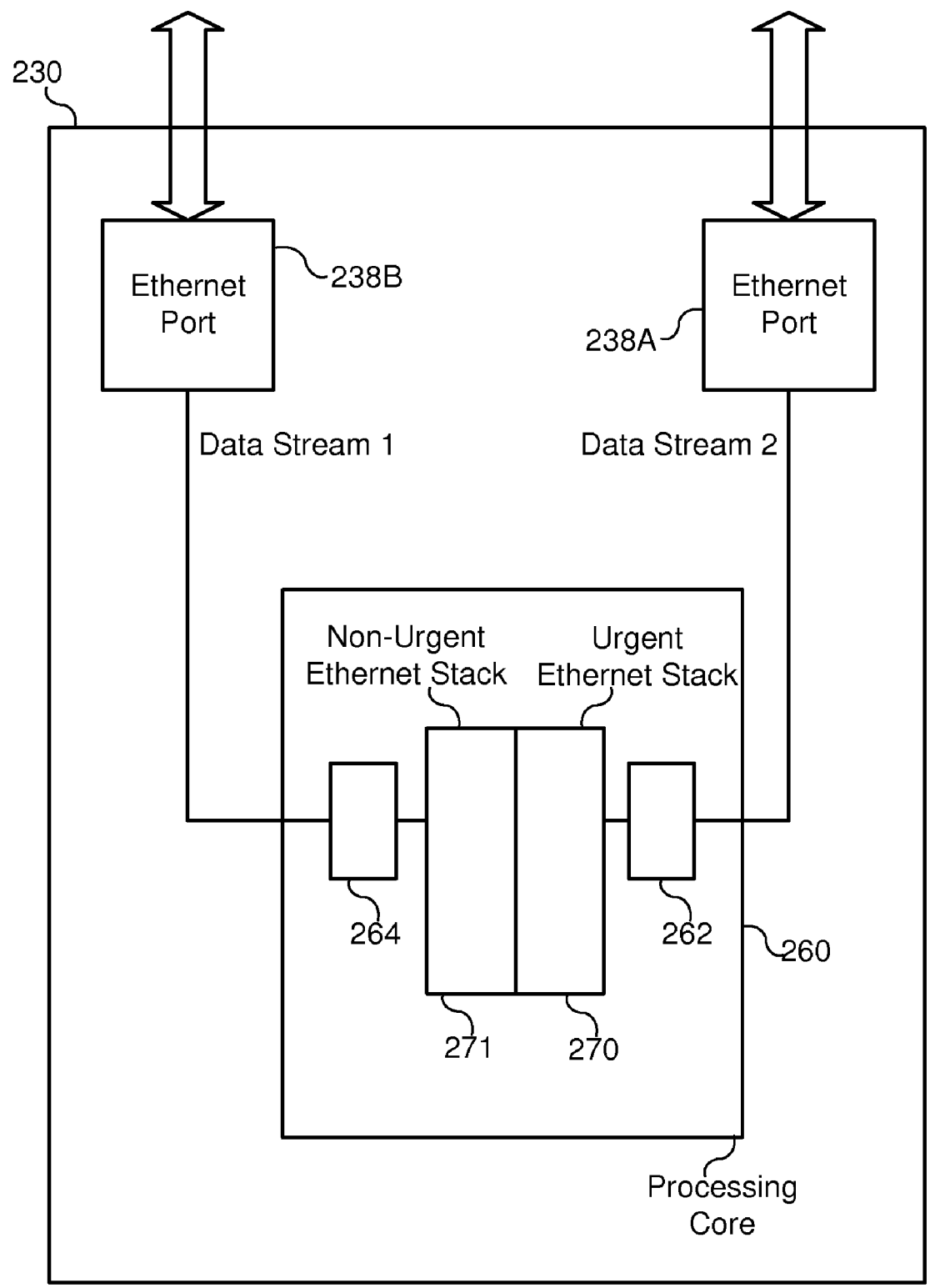
FIG. 4 is a simplified block diagram illustrating hardware and software components within a microcontroller used to segregate network data in accordance with this disclosure.

FIG. 4 depicts a simplified block diagram of hardware and software components within a microcontroller used to implement a network data segregation system in accordance with an embodiment of this disclosure. Ethernet frames are received on Ethernet ports 238A and 238B, which may be integrated into microcontroller 230 as depicted. After being received, frames are directed to the processing core 260, where urgent frames received by port 238A are buffered in a first memory buffer 262, while non-urgent frames received by port 238B are buffered in a second memory buffer 264. Memory buffers 262 and 264 may be implemented as, for example, a software FIFO, or some other data structure. The contents of memory buffer 264 is then directed to non-urgent Ethernet stack 271. The contents of memory buffer 262 is directed to urgent Ethernet stack 270, which is optimized for processing urgent communications data. The contents of either buffer may be directed frame by frame, or a block of frames may be copied at once.

Contents of the urgent frame buffer 262 are handled on an expedited basis. One way this may be accomplished would be to generate an interrupt every time a frame is received by Ethernet port 252A, and to handle processing of the frame within an interrupt handler. However, other scheduling mechanisms could be used as well to ensure that urgent frames are handled on an expedited basis.

Urgent Ethernet stack 270 and non-urgent Ethernet stack 271 may be programmed to send data using either or both of ports 238A and 238B. If programmed to send data using one port, then both urgent data and non-urgent data is sent using the same port. Generally, if one port is used, urgent data will be sent immediately, while non-urgent data will be buffered until all urgent data has been sent. However, if both ports are used, both urgent, and non-urgent data may be sent immediately, with the ordering handled by the switching device (not depicted in FIG. 4).

Figure 5:
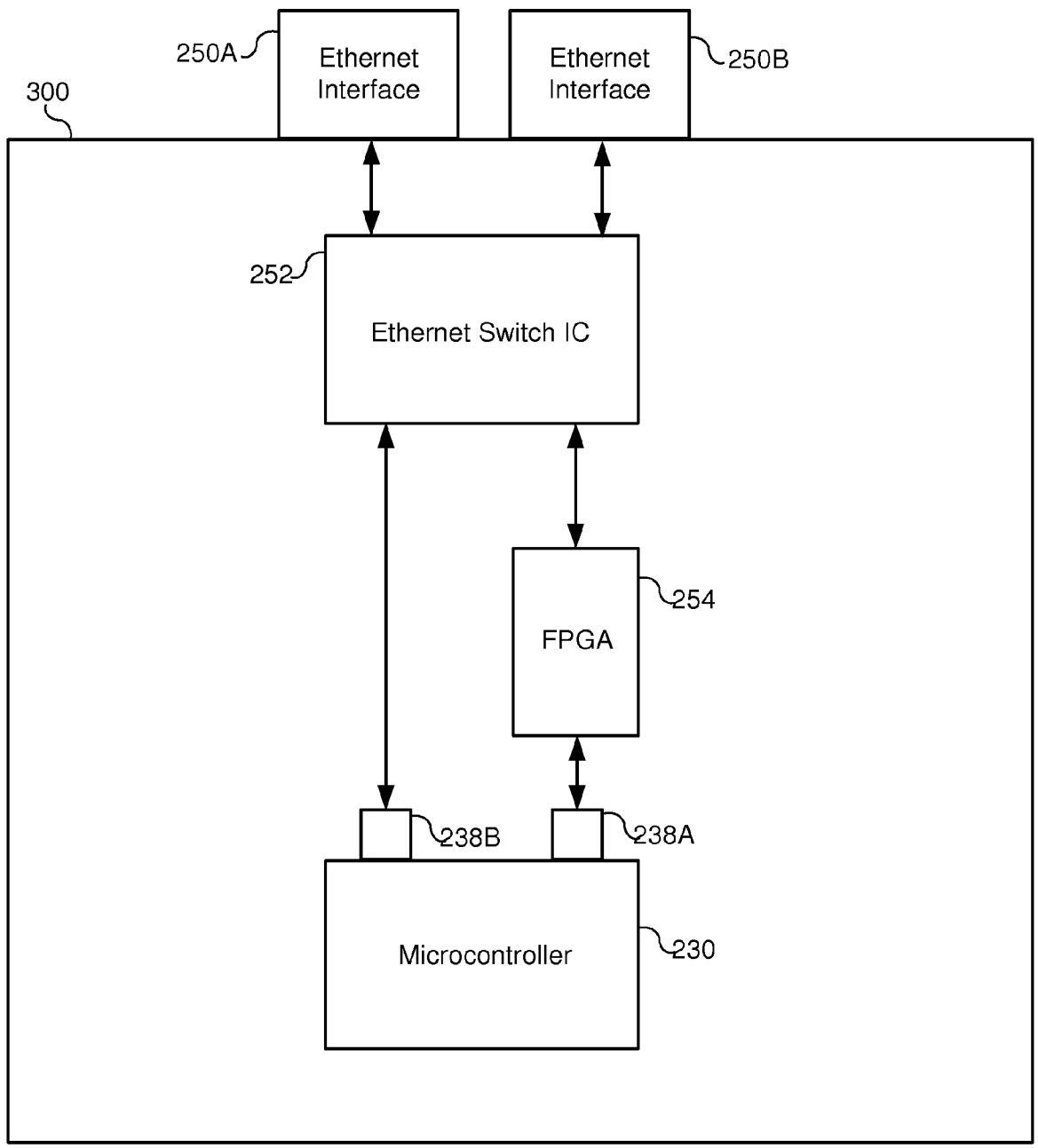
FIG. 5 is a simplified block diagram of a hardware solution to segregate network data in accordance with this disclosure and using multiple external network ports.

FIG. 5 depicts an alternate embodiment of the disclosed network data segregation system, including a pair of external Ethernet interfaces, as opposed to the single network interface depicted in FIGS. 1-4. In particular, Ethernet interfaces 250A and 250B receive network data from other devices associated with a power grid. Network data is routed to an Ethernet switch IC 252. The Ethernet switch IC 252 operates to determine that network data originating from certain MAC addresses is routed as urgent data to the first Ethernet port 238A and data that originates from other MAC addresses is routed as non-urgent data to the second Ethernet port 238B. The remainder of this figure operates similarly to the embodiment described in the text corresponding to FIG. 3.

It should be noted that data can be received and transmitted by either or both external Ethernet interfaces, with the Ethernet switch IC 252 operating as a general Ethernet switch or as a failover switch, using one external Ethernet interface until a failure is detected, and then switching to the other external Ethernet interface. It should also be noted that while two external network ports are depicted in FIG. 5, a person of skill in the art will realize that the disclosed network data segregation system and method may be extended to an arbitrary number of external network ports. Further, with respect to FIG. 5, a person of skill in the art will understand that the use of the MAC address as a routing key is exemplary, and other fields of the data frame may be used to equal effect.

It should be noted that while Ethernet is depicted in the figures and referred to throughout this specification, a person of skill in the art will realize that other physical networking mediums could be used as well. For example token ring networks, such as ARCNET and FDDI could be used with the disclosed network data segregation apparatus, systems and methods.

Figure 6:
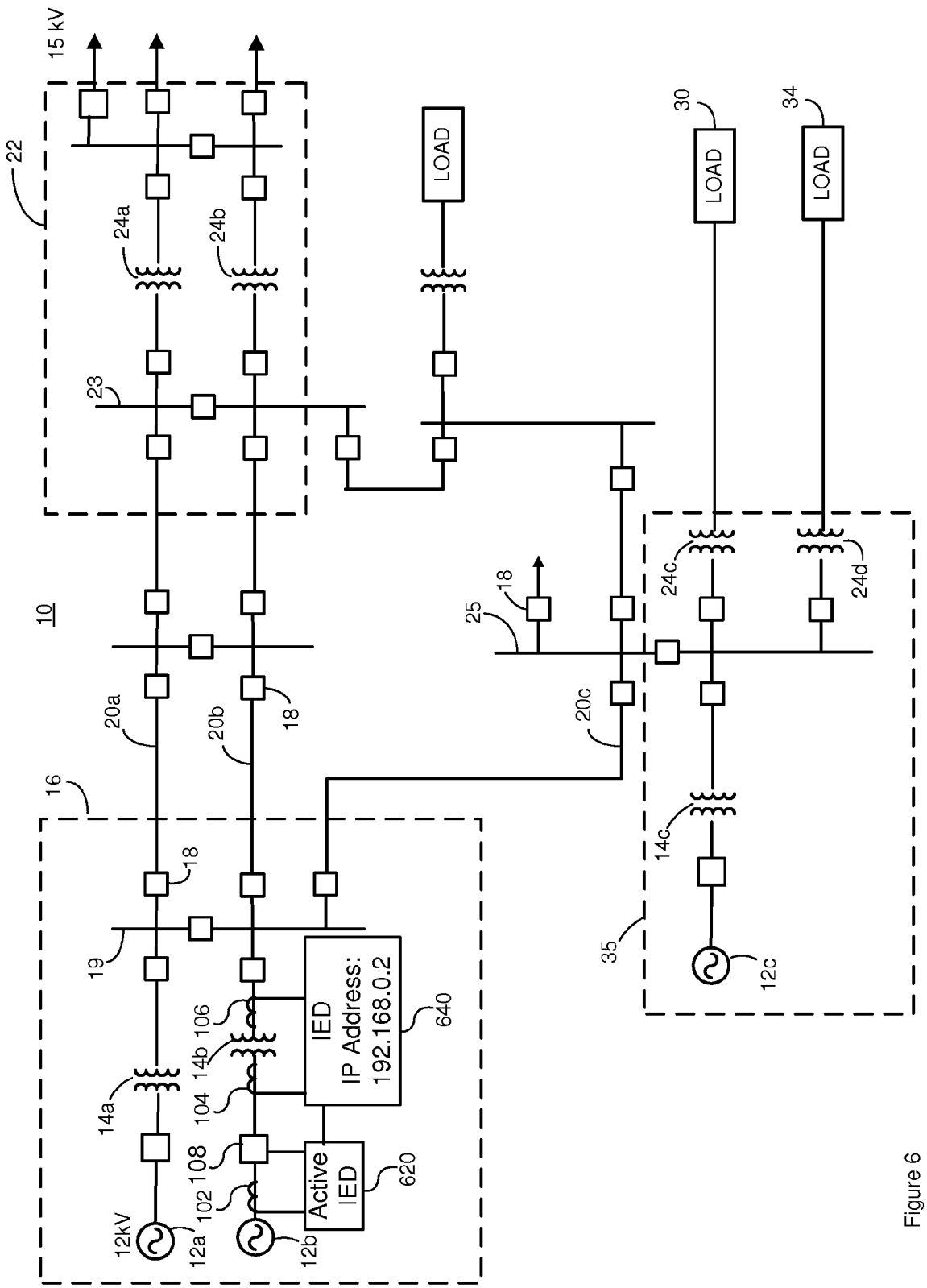
FIG. 6 is a simplified line schematic diagram of an electrical power distribution system illustrating the use of IEDs supervising a power grid, wherein the IEDs are associated with subscription identifiers used by an active IED to order the processing of messages from those IEDs.

FIG. 6 shows a power distribution system similar to that discussed above with regards to FIG. 1. However, FIG. 6 further illustrates an active IED 620 and a publishing IED 640 that the active device 620 has subscribed to. As explained herein, this disclosure develops a novel system and method for processing messages within an IED.

The system of this disclosure is implemented by the IED of FIG. 2. The methods disclosed herein can operate on the microcontroller 230 or on another form of processing device. Furthermore, messages may be received and transmitted using the methods discussed herein, as well as the Ethernet interface 250, Switch 252, Filter 254, and Ethernet ports 238A and 238B.

Figure 7:
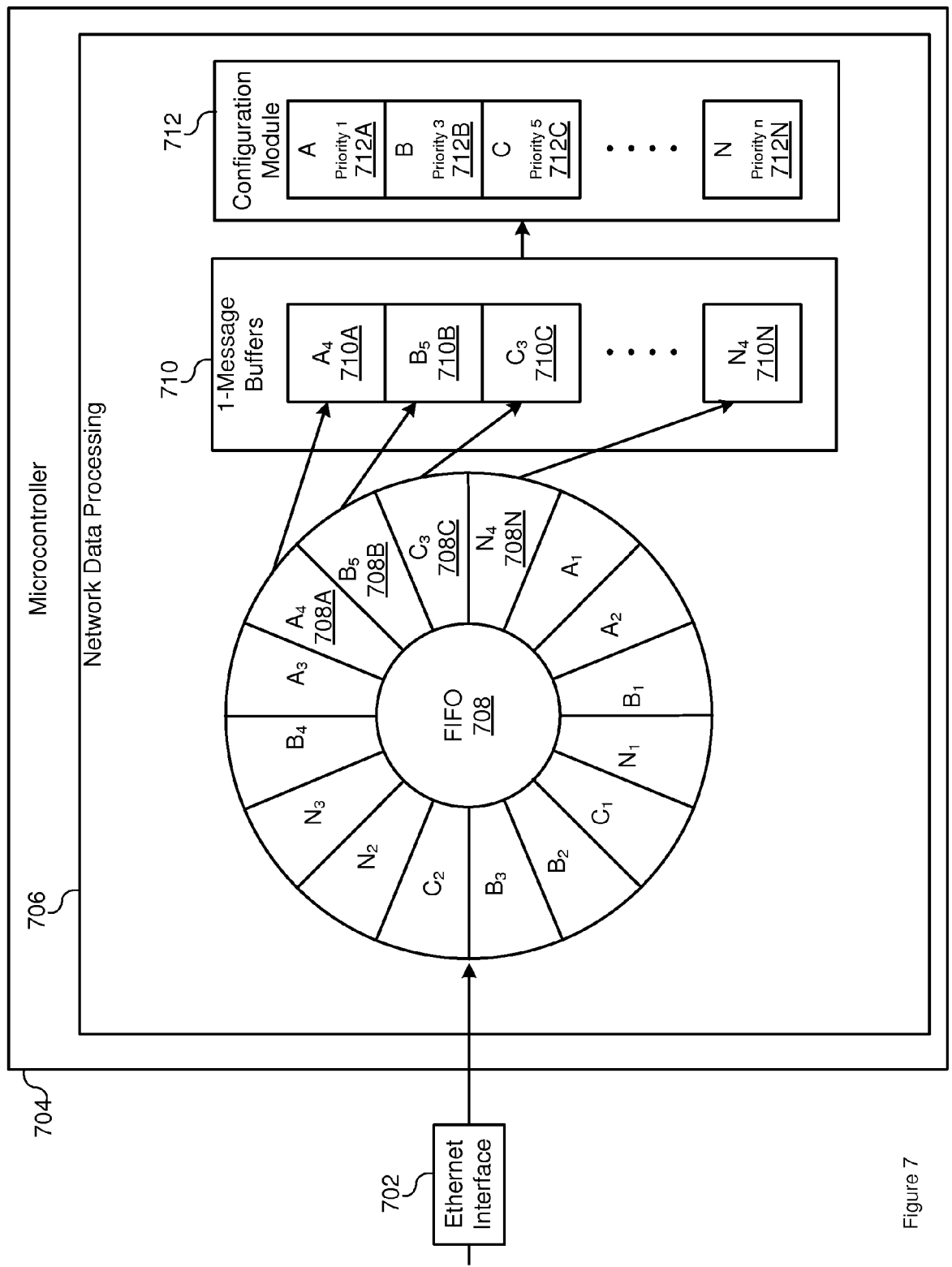
FIG. 7 is a high level flow diagram illustrating a system and method for processing network messages in accordance with a priority assigned to a subscription identifier associated with each message.

FIG. 7 is a high level diagram illustrating the message processing method and system disclosed herein. Generally, an Ethernet Interface 702 receives frames from one or more IEDs. As background, each of the IEDs publishes a stream of messages that the receiving IED 704 subscribes to. The receiving IED 704 assigns a priority to each of the message streams based on the importance of the stream to the receiving IED 704.

As frames are received, they are placed into a circular buffer, or FIFO 708. A microcontroller disposed within an IED (not depicted) executes a network data processing module 706. The microcontroller executes software instructions that examine the contents of the FIFO 708, and, based on a subscription identifier contained within each of the messages 708A, 708B, 708C . . . 708N within the FIFO 708, routes each of the messages 708A-N to a one message buffer 710A, 710B, 710C . . . 710N. The subscription identifier can be an identifier encoded within an Ethernet Frame, such as, for example, a VLAN Priority Code, or it may be an identifier determined using a configuration module 712. One way to implement a configuration module 712 would be to match the source MAC address from the received Ethernet Frame to a user assigned priority contained in a list 712A, 712B, 712C . . . 712N comprising the configuration module 712. As explained herein, the microcontroller can then service each of the one message buffers in priority order.

Figure 8:
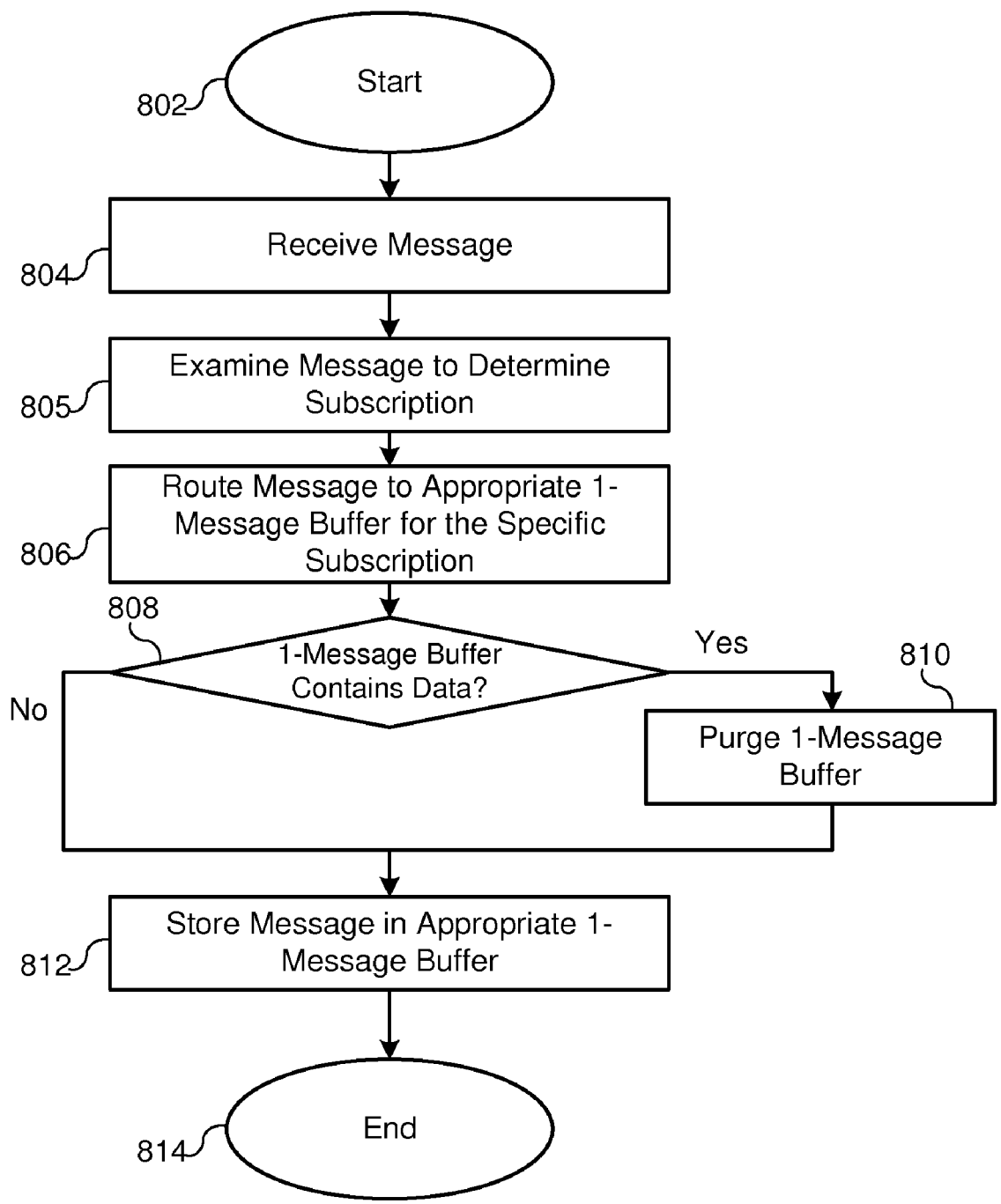
FIG. 8 is a flowchart illustrating the processing of a receive FIFO, and the transfer of messages received in that FIFO to a plurality of single message buffers.

FIG. 8 depicts a flowchart that illustrates a method for processing the receive FIFO 708. As this method is time sensitive, it is suitable to execute as an interrupt or using another high-priority scheduling mechanism. As depicted, the method begins in step 802. In step 804, a message is received into the FIFO, and in step 805 the message is examined to determine a corresponding subscription. As discussed earlier, this may be done in a number of ways. For example, a priority code, determined by the user, may be embedded within the VLAN priority code field of each Ethernet frame. Alternatively, a configuration module may be employed to match values to each subscription based on the source MAC address or other information, including the VLAN priority code, embedded within each Ethernet frame. Other methods may be utilized as well to associate subscriptions and priorities to each of the received messages, and, unless reflected in the claims, the specific mechanisms discussed herein should not be taken as a limitation of the invention.

In step 806, a message is routed to the appropriate 1 message buffer corresponding to the associated subscription. If the 1 message buffer already contains data, the data there is purged or overwritten by the new message in step 810, and in step 812, the data is stored in the 1 message buffer. The method exits in step 814.

Figure 9:
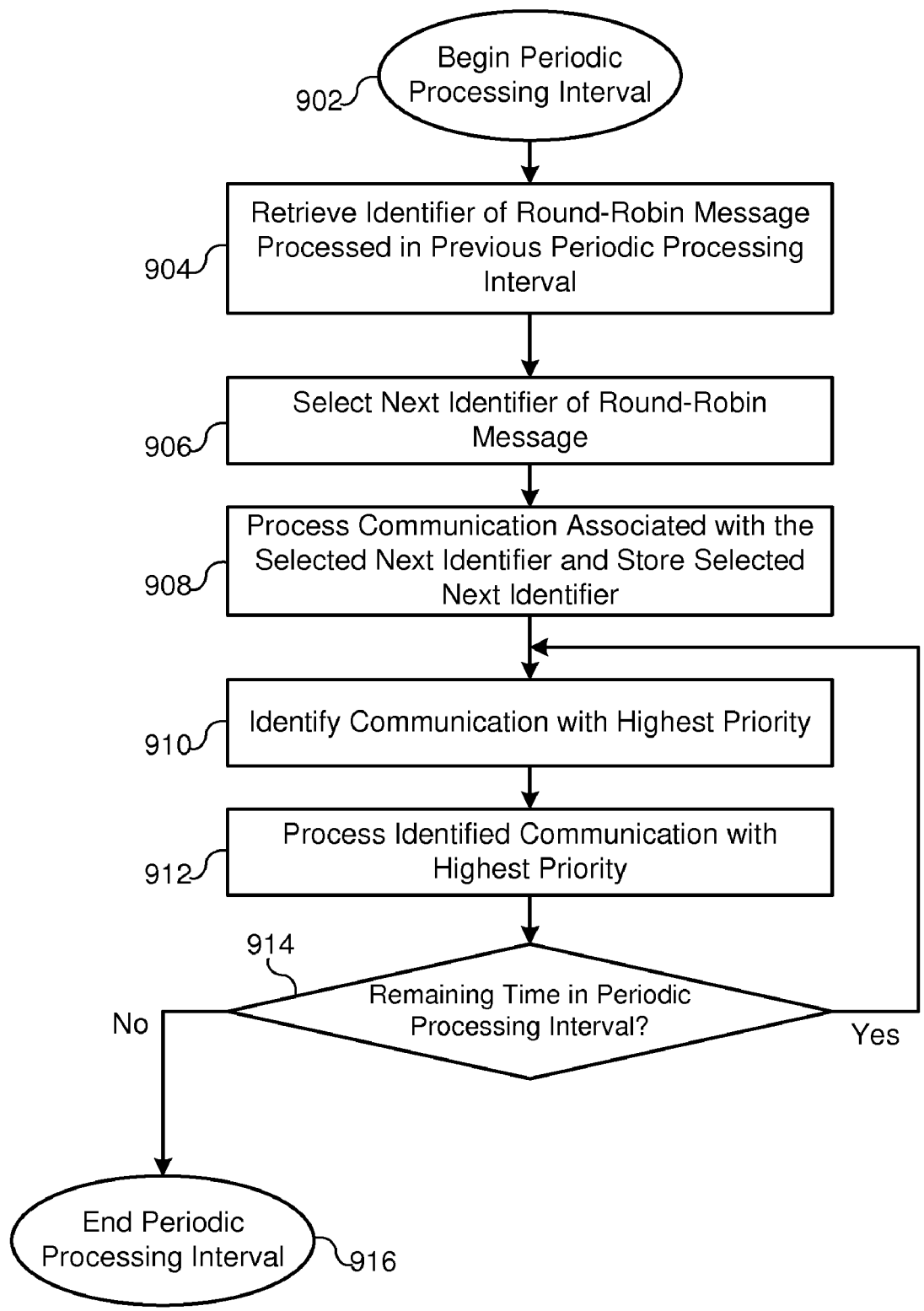
FIG. 9 is a flowchart illustrating the servicing of subscription buffers in accordance with the priority assigned to each subscription buffer.

FIG. 9 depicts a method for servicing the subscription buffers in accordance with this disclosure. In high level terms, a processing budget is allocated to the method. One subscription is selected on a round robin basis, and if a message is pending for that subscription, it is processed first, and the processing required for that subscription is subtracted from the processing budget. The method will then proceed sequentially through the remaining subscriptions until the processing budget is depleted, at which point the method exits.

More specifically, in step 902, the method is entered. In step 904, a subscription identifier corresponding to the last message processed on a round-robin basis is retrieved, and in step 906, the identifier corresponding to the next message to be processed on a round-robin basis is selected. The buffer corresponding to the selected subscription is then processed in step 908.

In step 910, the subscription buffer containing a message and having the highest priority is identified, and in step 912, that message is processed. The processing budget is checked in step 914 and if any processing budget remains, execution returns to step 910, where the subscription buffer with the next highest priority is identified. On the contrary, if the processing budget is exhausted, the method proceeds to step 916, which exits the method.

Figure 10:
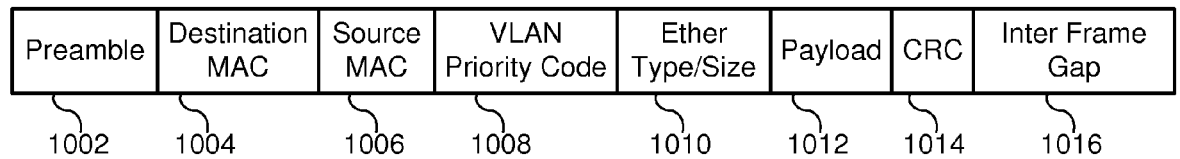
FIG. 10 is a frame diagram illustrating various components of a frame header, as well as the payload.

FIG. 10 depicts an Ethernet frame diagram, showing the various components of an Ethernet frame. In particular, a frame comprises a preamble 1002, a destination MAC address 1004, a source MAC address 1006, a VLAN Priority Code 1008, an Ether Type/Size field 1010, a Payload 1012, a CRC 1014, and an Inter Frame Gap 1016.

Figure 11:
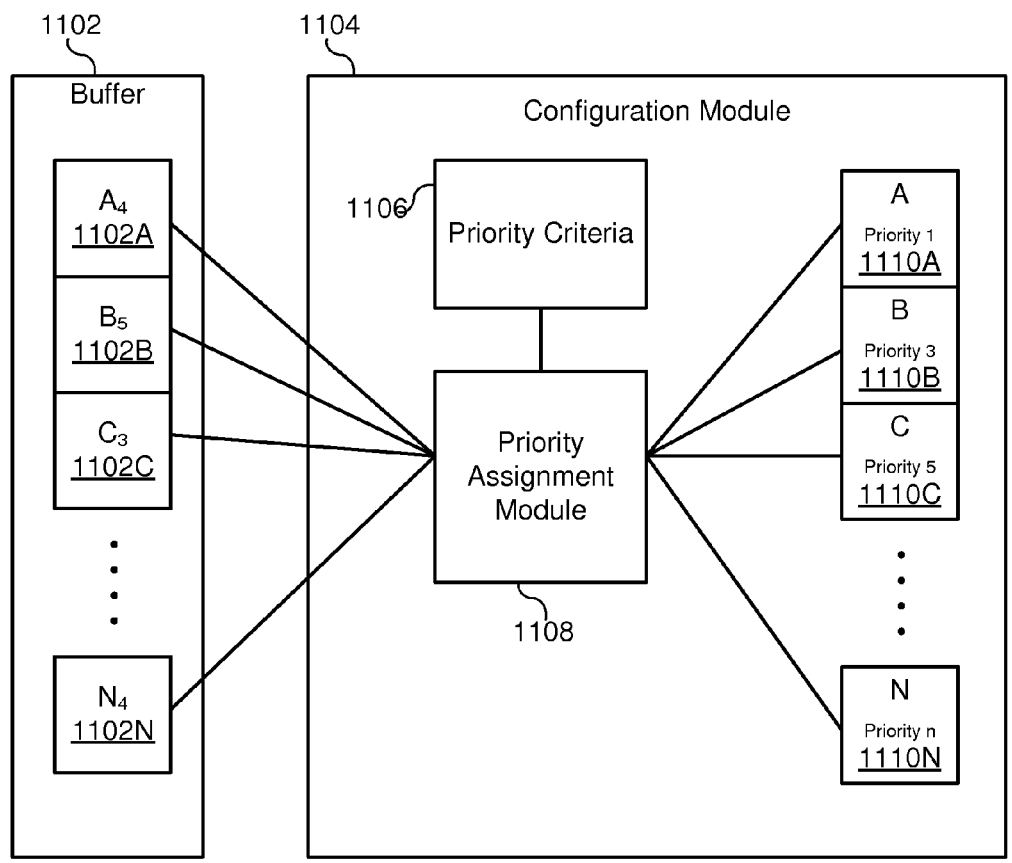
FIG. 11 is a block diagram of a configuration module constructed in accordance with the disclosed invention.

FIG. 11 is a block diagram of a configuration module constructed in accordance with the disclosed invention. The configuration module 1104 associates subscription identifiers A, B, C . . . N and the corresponding subscription buffers 1102A, 1102B, 1102C . . . 1102N with a priority 1110A, 1110B, 1110C . . . 1110N. In particular, the configuration module 1104 incorporates a priority criteria 1106, which may be a configuration file setup by a user associating different subscriptions with a priority level. A priority assignment module 1108 associates the user assigned priority with a subscription identifier, thereby assigning a priority to each of the one message buffers 1102.

Figure 12:
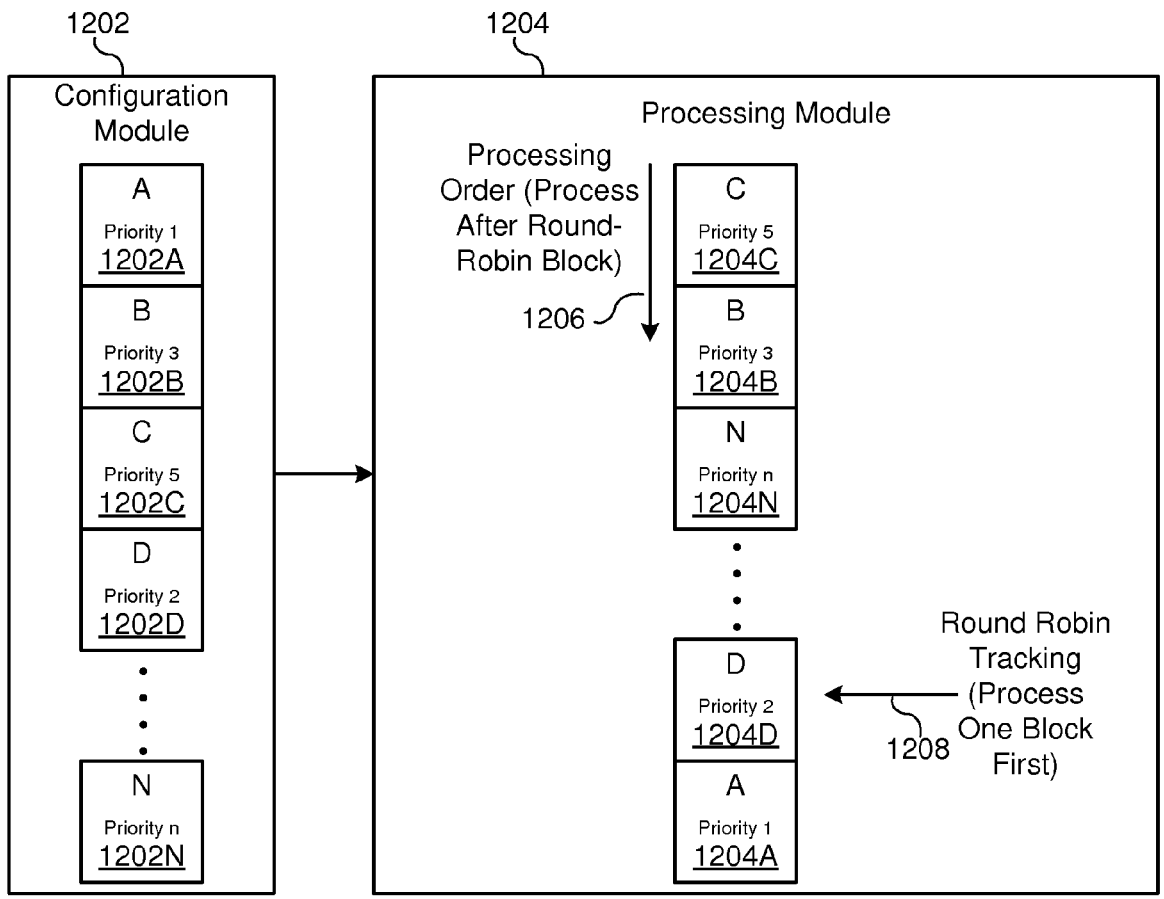
FIG. 12 is a block diagram of a processing module illustrating the round robin processing of subscription buffers followed by the priority processing of subscription buffers.

FIG. 12 is a block diagram of a processing module that processes subscriptions in accordance with this disclosure. As illustrated, a configuration module 1202 assigns priority levels to different subscriptions. Generally, messages are processed according to the priority level of the corresponding subscription. For example, if a first subscription A 1202A is assigned a priority level of 1 and a second subscription B 1202B is assigned a priority level of 3, the second subscription B 1202B will generally be processed before the first subscription A 1202A every time that the second subscription B 1202B has data available. This is illustrated by block 1206. While it is desirable to have higher priority subscriptions serviced before lower priority subscriptions, this can lead to the circumstance where a particular subscription is never serviced, if, for example, data is received continuously to those subscriptions with higher priority and the processing required to process those subscriptions meets or exceeds the processing budget. To prevent this situation, a single subscription is processed during every processing cycle on a round robin basis before any other subscriptions are processed in their priority order. The round robin process is illustrated by block 1208.

In particular, the round robin scheduler processes one subscription every cycle. Generally, all subscriptions are ordered in priority order, such as, for example, the order depicted in FIG. 12, i.e. subscription A, D . . . N, B, and C. The round robin scheduler tracks which subscription was processed during the last cycle, and will process the next subscription during the present cycle using the priority order. While a priority order is depicted and described, persons of skill in the art will understand that other scheduling schemes may be used as well.

Figure 13:
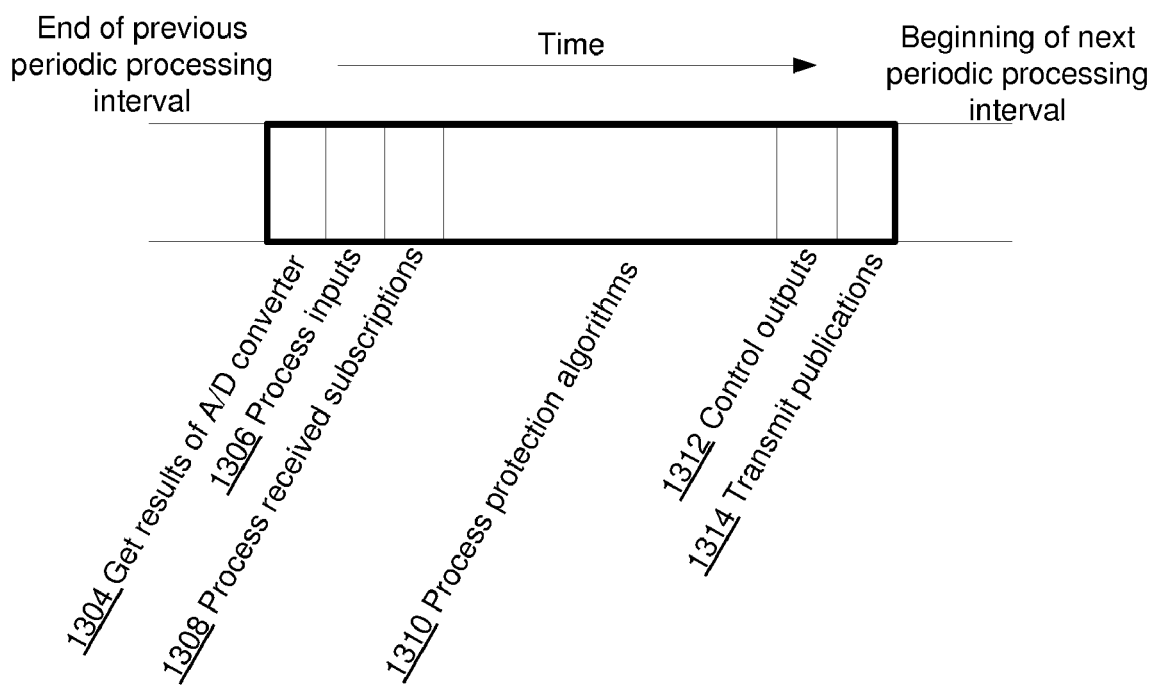
FIG. 13 is a high level sequence diagram illustrating the process flow of an IED constructed in accordance with this disclosure.

An additional aspect of the disclosed high priority traffic processing system is limiting the amount of processor time spent on each message so that processing of messages will not starve out other IED tasks. FIG. 13 illustrates a simple process flow that an IED constructed in accordance with this disclosure could execute. As depicted, the IED gathers samples for a number of monitored inputs, such as currents and voltages, using one or more A/D converters in step 1304. The inputs are processed in step 1306, and received subscriptions are processed in step 1308 using the methods described herein. In step 1310, protection algorithms are processed, and in step 1312 control outputs are processed. In step 1314 the IED publishes any quantities that it makes available to other IEDs in a power protection network. As is readily understood, while processing subscriptions and publications are important to the operation of the IED, other tasks, such as processing protection algorithms, are vital as well. Accordingly, a method must be employed to ensure that all time critical tasks are carried out. FIG. 14 depicts a receive FIFO 1402, such as that discussed earlier in regards to the priority based message handling system and method. Next to each message a cost for processing that message is depicted. These costs range anywhere from 10 to 100, reflecting the different factors that affect the time it takes to process a message, such as, for example, the size of the message and the type of data encoded in the message.

Figure 15:
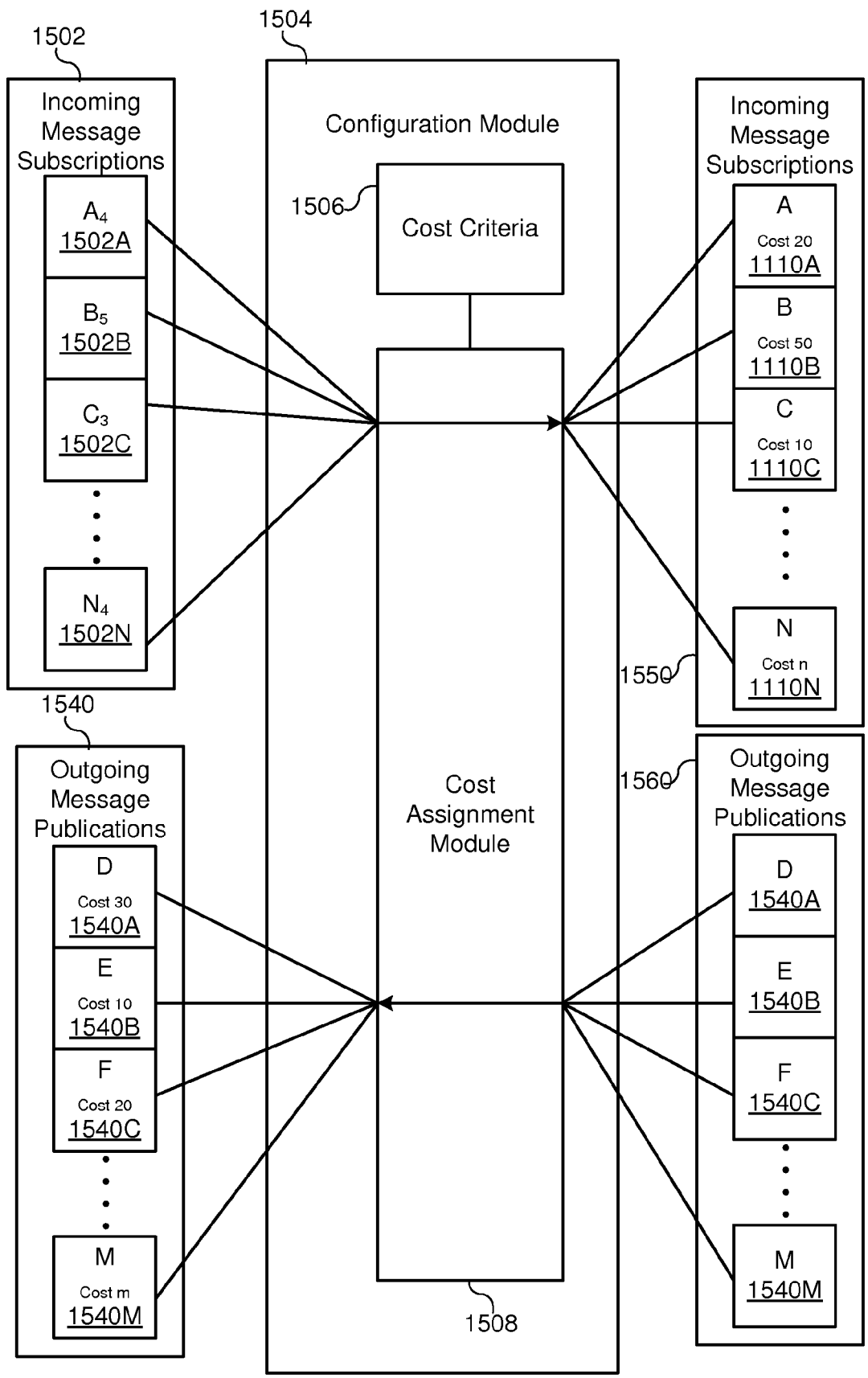
FIG. 15 is a high level flow diagram illustrating the process of servicing a budget of subscriptions each with a particular cost criteria.

FIG. 15 depicts a configuration module 1504 for computing and associating costs with incoming message subscriptions 1502 and outgoing message publications 1560. A cost criteria 1506 is used by a cost assignment module 1508 to assign a cost to each incoming message 1502.

In one embodiment, a configuration file associates each subscription or publication with a fixed cost. In such an embodiment, the cost criteria 1506 could be a user setup configuration file, and the cost assignment module 1508 would do little more than perform a lookup function. In another embodiment, different types of data could have different costs. In such an embodiment, the cost criteria 1506 would be a list of the costs of the different data types, and the cost assignment module 1508 would be required to parse the incoming messages to determine what type or types of data each message contained, and assign a cost to the message using the cost criteria 1506.

Figure 16:
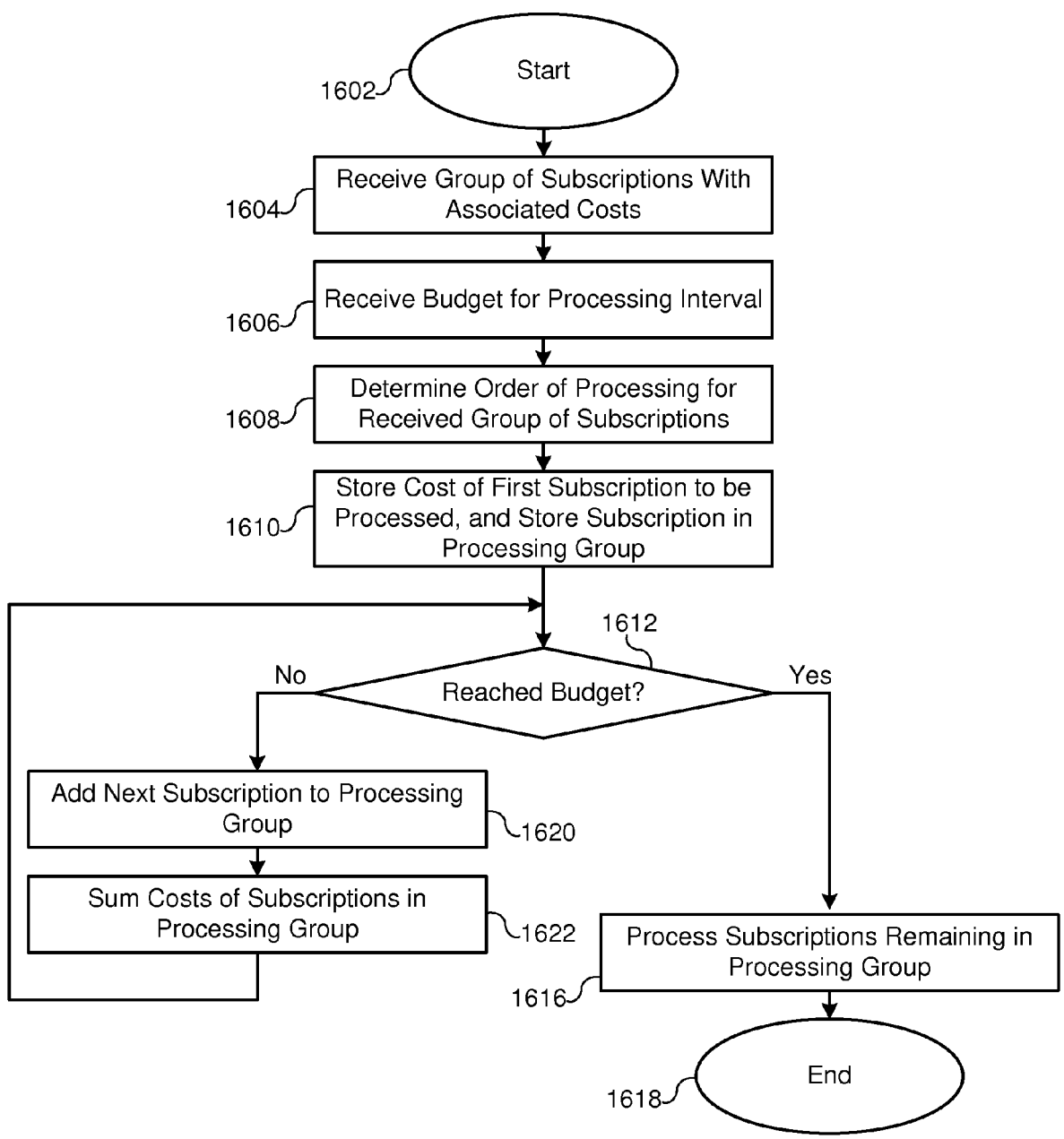
FIG. 16 is a more detailed flow chart explaining the process of servicing a budget of subscriptions each associated with a particular cost criteria.

FIG. 16 details a method by which a budget of subscriptions is serviced in accordance with this disclosure. The method is entered in step 1602, and in step 1604, a group of subscriptions are received, each of which has an associated cost. In step 1606, the budget for the processing interval is identified, and in step 1608, the order in which the subscriptions are to be processed is determined, using, for example, the priority based scheduling method detailed earlier in this disclosure. In step 1610 the cost of the first subscription to be processed is stored, and the subscription message is stored in the processing group. The cost of processing the message is subtracted from the budget in step 1612 and a determination is made as to whether any budget remains to process additional messages. If the processing budget is reached, execution transitions to step 1616 where the subscriptions in the processing group are processed, and the method exits in step 1618. However, if processing budget remains, execution will transition to step 1620, where the next subscription is added to the processing group. In step 1622, the cost to process the subscription group is summed, and, execution returns to step 1612.

Figure 17:
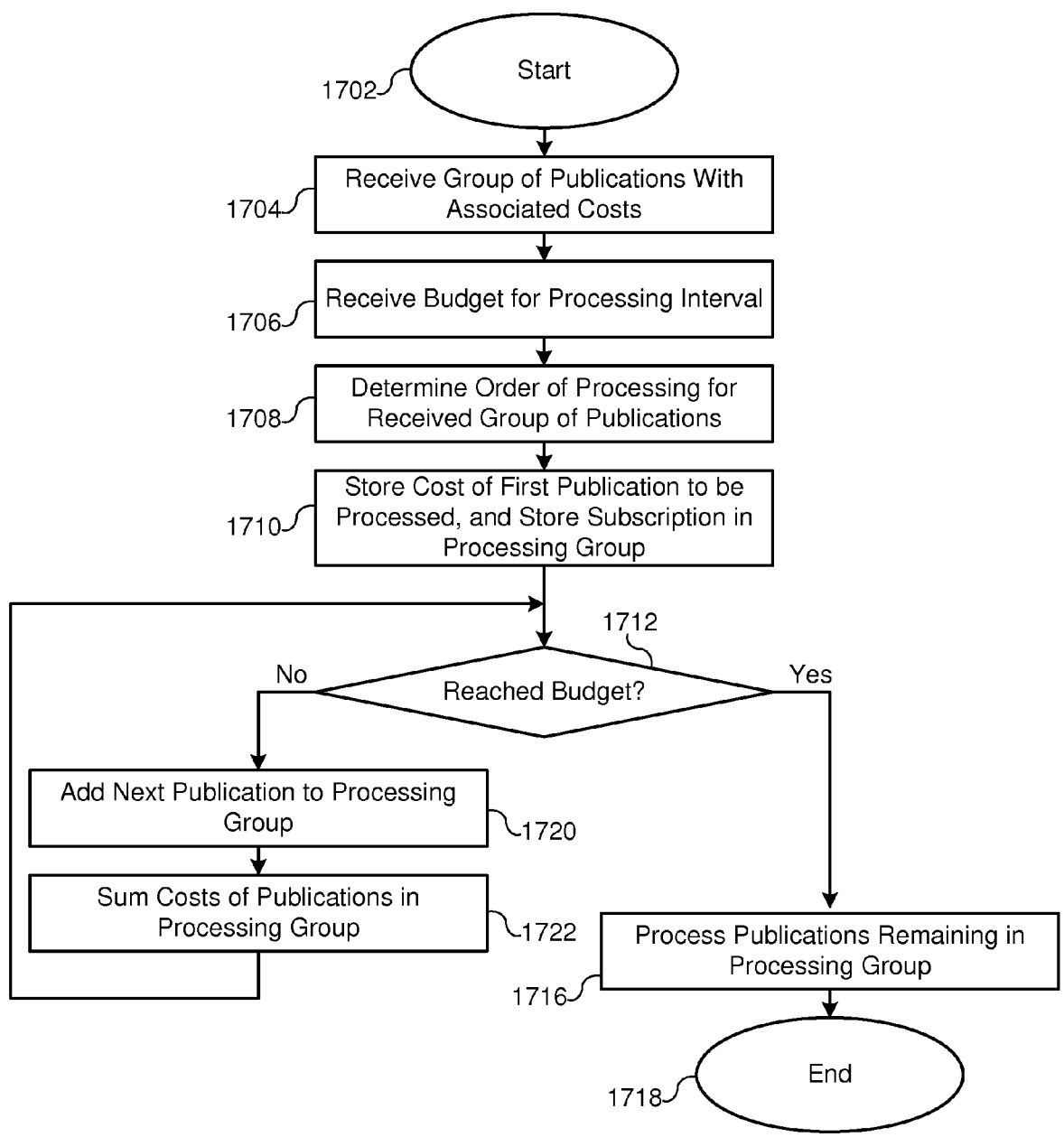
FIG. 17 is a flowchart explaining the processing of a particular budget of publications.

FIG. 17 details a method by which a budget of publications is serviced in accordance with this disclosure. The method is entered in step 1702, and in step 1704, a group of publications is received, each with an associated cost. In step 1706, the budget for the processing interval is received, and in step 1708, the order in which publications are to be processed is determined. In step 1710, the first publication to be processed is stored in the processing group along with its processing cost. The cost of processing the publication is subtracted from the budget in step 1712 and a determination is made as whether the processing budget was reached. If the processing budget was reached, the publications in the processing group are processed, and the method exits in step 1718. However, if processing budget remains, execution will transition to step 1720, where the next publication is added to the processing group. In step 1722, the cost to process the publication group is summed, and execution returns to step 1712.

Figure 18A:
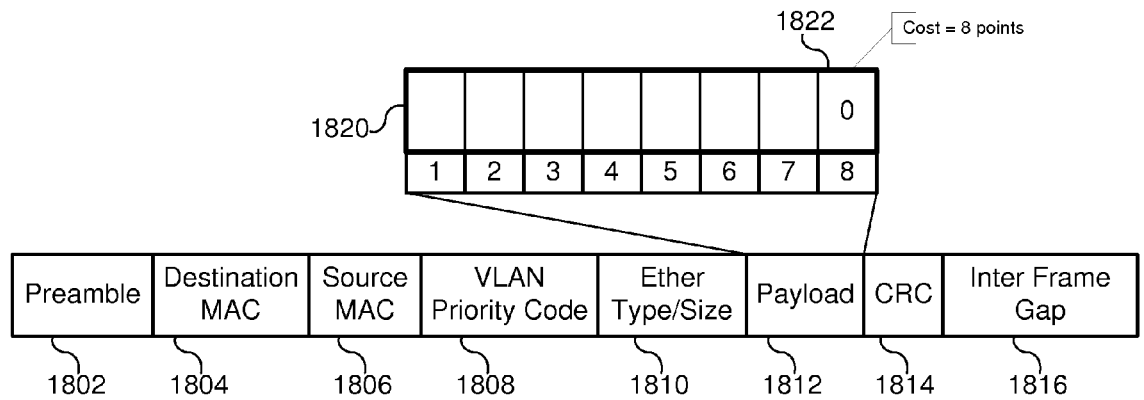
Figure 18B:
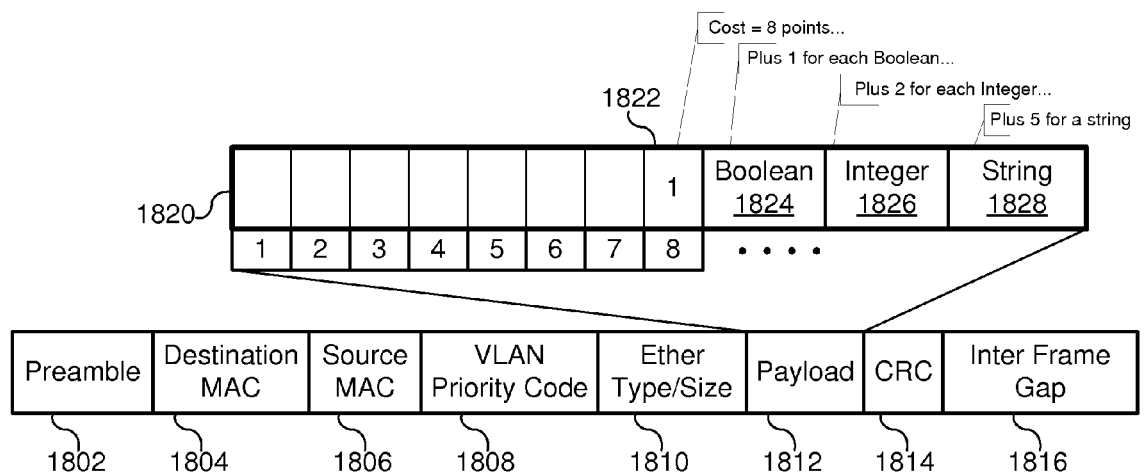

FIG. 18A illustrates a packet 1820 having a single payload field 1822. Generally, a fixed cost scheme is appropriate for such a packet, as the cost to decode the header of the payload will be fixed, and other pieces of data within the payload may or may not be used by the receiving IED, and, accordingly, may not present any cost. Accordingly, the configuration file approach discussed above would be appropriate. However, FIG. 18B illustrates a packet 1820 having a larger payload consisting of multiple types of data. For example, the illustrated packet shows that the payload consists of a Boolean field 1824 having a processing cost of 1, an integer field 1826 having a processing cost of 2, and a string field 1828 having a processing cost of 5. In addition, a cost of 8 is added to the message processing cost to account for fixed processing costs, such as parsing the message, memory operations, etc.

In some circumstances, very large packets, whose processing cost exceeds the entire budget for processing subscriptions or publications, may need to be processed. For example, an IED may have a processing budget of 128 for all subscriptions, and, in some circumstances, a very large, complex message may have a cost of 200 or more to process. In such a case, the message will be broken into two or more components, with each processed during successive cycles. Accordingly, given the circumstance of a large message having a processing cost of 200, and a total processing budget of 128, the message may be broken into two components, with the first component having a cost of 128, and the second having a cost of 80, i.e., the remaining 72 points, as well as an additional 8 in fixed processing costs that are incurred when any message or message component are processed.

Figure 19:
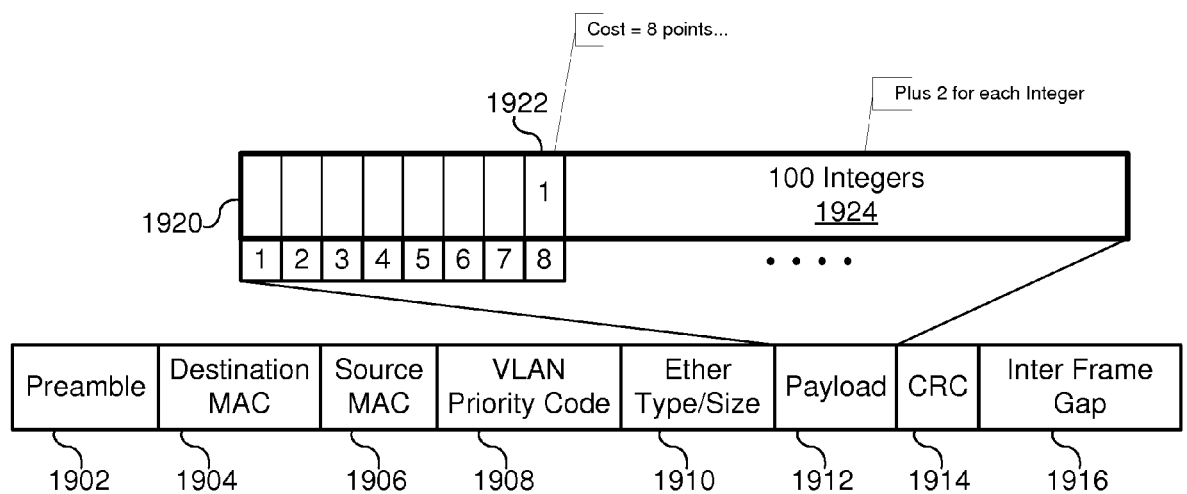
FIG. 19 illustrates a large frame constructed in accordance with this disclosure.

FIG. 19 shows such a very large packet. In particular, as with other Ethernet frames, this packet includes a preamble 1902, a destination MAC address 1904, a source MAC address 1906, a VLAN priority code 1908, an Ether type/size field 1910, a payload 1912, a CRC 1914, and an inter-frame gap 1916. As illustrated, the payload 1912 includes 100 separate integers, increasing the processing cost of this message to beyond that which would normally be done within a single period.

Figure 20:
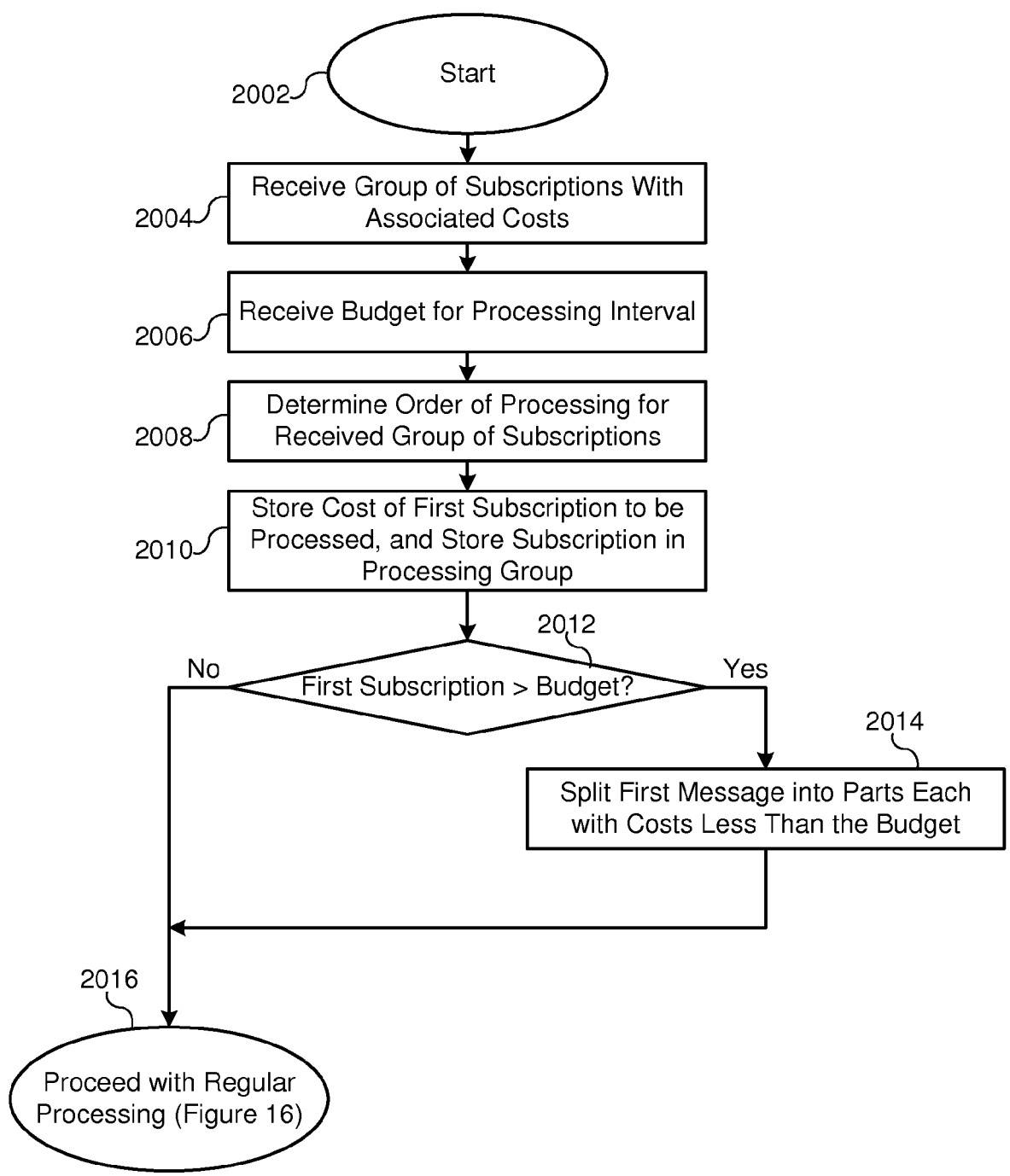
FIG. 20 is a flowchart explaining the process of breaking down a large packet into a sequence of smaller parts, each of which can be processed sequentially within a processing budget.

FIG. 20 illustrates a method for breaking up and processing a large packet such as that shown in FIG. 19. The method is entered in step 2002, and in step 2004 a group of subscriptions with associated costs is received. In step 2006, the processing budget for subscriptions is received, and in step 2008, the order in which subscriptions will be processed is determined, using, for example, the method disclosed earlier herein.

In step 2010, the cost of processing the first subscription is stored, and that subscription is stored in a processing group. The cost of processing the message is compared to the total processing budget in step 2012, and, if the cost of processing the first subscription is greater than the processing budget for all subscriptions, execution transitions to step 2014, where the message is broken into parts, each of which can be processed within one interval, given the IED's processing budget for subscriptions. However, if the cost of processing the subscription is not greater than the entire processing budget for all subscriptions, processing continues as normal in step 2016, using, perhaps the method of FIG. 16.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method operating within an intelligent electronic device for optimizing the handling of network data for the intelligent electronic device, the intelligent electronic device including a buffer for storing one or more messages originating from one or more other devices, each of said messages having a subscription identifier, the intelligent electronic device further including one or more buffers, each holding at least one message and associated with a specific subscription identifier, the method comprising the steps of:
   i) examining a message to determine the subscription identifier therewith associated;
   ii) routing the message to and storing the message in the buffer associated with the subscription identifier
   iii) receiving a processing budget for a cycle of subscriptions;
   iv) transferring one or more of the messages in the buffers to a processing group, in accordance with said processing budget; and;
   v) processing the messages in the processing group.

2. The method of claim 1 wherein the intelligent electronic device further includes a list of subscription identifiers and wherein the step of examining comprises comparing a source MAC address to the list of subscription identifiers.

3. The method of claim 1 wherein said intelligent electronic device further includes a list associating each of said subscription identifiers with a priority, and wherein the method further comprises the step of sequentially processing each of said buffers that stores a message in the order specified by the list so that buffers that associated with subscription identifiers having a higher priority are processed before buffers associated with subscription identifiers having a lower priority.

4. The method of claim 1 wherein the step of storing comprises overwriting a previous message stored in the buffer.

5. The method of claim 1 further comprising the steps of:
   i) assigning each message a processing cost;
   ii) decrementing the processing budget by the processing cost for a message prior to transferring said message to the processing group; and
   iii) processing only those messages that are transferred to the processing group before the processing budget is exhausted.

6. A system for handling network data within an intelligent electronic device, the intelligent electronic device operating within a power protection system including one or more other devices, the system comprising:
  i) a network interface;
  ii) a first-in-first-out buffer (FIFO) coupled to the network interface, the FIFO storing one or more messages originating from the other devices wherein each of said messages includes a subscription identifier;
  iii) one or more message buffers each associated with a subscription identifier; and
  iv) a processor operatively associated with the network interface, the FIFO, and the one or more message buffers, the processor further executing the following steps:
    1) examining a message from said FIFO to determine the subscription identifier therewith associated;
    2) routing the message to and storing the message in the buffer associated with the subscription identifier;
    3) receiving a processing budget for a cycle of subscriptions;
    4) transferring one or more of the messages in the buffers to a processing group, in accordance with said processing budget; and,
    5) processing the messages in the processing group.

7. The system of claim 6 further comprising a list of subscription identifiers operatively associated with the processor, and wherein the processor compares a source MAC address within the message to the list of subscription identifiers to determine the buffer to route the message to.

8. The system of claim 6 further comprising a list associating each of the subscription identifiers with a priority, and wherein the processor performs the step of sequentially processing each of said buffers that stores a message in the order specified by the list associating the subscription identifiers having a higher priority are processed before buffers associated with subscription identifiers having a lower priority.

9. The system of claim 6 wherein the processor performs the steps of:
  i) assigning each message a processing cost;
  ii) decrementing the processing budget by the processing cost for a message prior to transferring said message to the processing group; and
  iii) processing only those messages that are transferred to the processing group before the processing group is exhausted.

* * * * *